June 4, 1935.  E. L. FIX ET AL  2,003,288
LAMINATED GLASS AND PROCESS OF MAKING THE SAME
Filed June 28, 1934
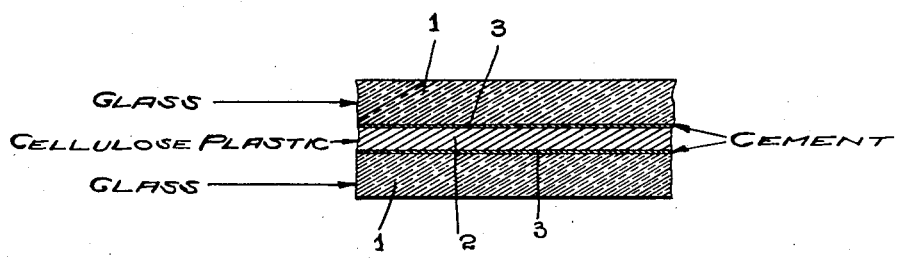
INVENTORS
EARL L. FIX AND
E. J. DENNISON
BY
      Bradley + Bee
/ATTORNEYS Patented June 4, 1935

2,003,288

UNITED STATES PATENT OFFICE 2,003,288

LAMINATED GLASS AND PROCESS OF MAKING THE SAME

Earl L. Fix, New Kensington, and Brook J. Dennison, Tarentum, Pa., assignors to Duplate Corporation, a corporation of Delaware Application June 28, 1934, Serial No. 732,808

6 Claims. (Cl. 49—81)

The invention relates to laminated glass which ordinarily consists of two sheets of glass cemented to the opposite sides of a sheet of cellulose plastic. Very considerable difficulty is encountered in cementing glass to cellulose acetate, ethyl cellulose, and to cellulose nitrate when the latter contains a high percentage high boiling plasticizer, and the invention is directed primarily to use with these plastics. The objects of the invention are the provision of a process and cementing medium, (1) which can be used under ordinary compositing conditions, namely at temperatures ranging from 240 degrees to 275 degrees F.; (2) which will give a product that, under break tests, show results comparable with those now secured when ordinary cellulose nitrate is laminated using gelatin as a cement; and (3) which shows good adhesion under continued exposure tests, such as are recognized and established in the art. A plate of laminated glass made in accordance with the invention is shown in the accompanying drawing, wherein:

The figure is a sectional view through the plate.

In the drawing, 1, 1 are sheets of glass; 2 is a sheet of cellulose plastic; and 3, 3 are layers of the cementing medium.

Briefly stated, the invention involves the use of a compound of boron, such as boric acid in combination with one of the weak acids, such as silicic acid. The boron compounds used have, on ordinary examination, little or no stickiness, but when compounded with the silicic acid or some other of the weak acids, later set forth, they form powerful adhesives for glass and cellulose plastic, the bond resulting being secure and permanent, as evidenced by break tests after long periods, and by proof exposure.

A specific example of the cement as used with cellulose nitrate, cellulose acetate and ethyl cellulose is as follows:

| | Grams |
|---|---|
| Boric acid | 0.25 |
| Saturated solution silicic acid | 0.25 |
| H₂O | 100 |

In composition, the mixture is placed on the glass sheets in a thin film, preferably by spraying, and allowed to dry, after which the glass sheets are applied to the cellulose plastic sheet, and a lamination is secured in the usual way by the application of heat and pressure, preferably by the hydraulic method of the Sherts and Hamill Patent No. 1,781,084, the pressure employed in the final pressing being about 150 pounds per square inch, and the temperature being about 240 degrees F.

Other examples of the cement found satisfactory are as follows:

| | Grams |
|---|---|
| Sodium borate or perborate | 1.0 |
| Saturated solution silicic acid | 0.25 |
| H₂O | 100 |

| | Grams |
|---|---|
| Boric acid | 0.25 |
| Saturated solution stannic acid | 0.25 |
| H₂O | 100 |

| | Grams |
|---|---|
| Potassium tetraborate | 1 |
| Saturated solution chromic acid | 0.25 |
| H₂O | 100 |

| | Grams |
|---|---|
| Boric acid | 0.25 |
| Saturated solution arsenic acid | 0.25 |
| H₂O | 100 |

The invention contemplates the combination of two or more of the weak acids, or two or more of the boron compounds, although there is no practical advantage in such combination.

What we claim is:

1. A method of compositing a sheet of cellulose plastic and a glass sheet which comprises the step of coating the face of the glass sheet with a solution of a boron compound and one of the weak acids of the group consisting of silicic acid, stannic acid, chromic acid and arsenic acid, assembling the sheets and applying heat and pressure.

2. A method of compositing a sheet of cellulose plastic and a glass sheet which comprises the step of coating the face of the glass sheet with a solution of boric acid and one of the weak acids of the group consisting of silicic acid, stannic acid, chromic acid and arsenic acid, assembling the sheets and applying heat and pressure.

3. A method of compositing a sheet of cellulose plastic and a glass sheet which comprises the step of coating the face of the glass sheet with a solution of a sodium borate compound and one of the weak acids of the group consisting of silicic acid, stannic acid, chromic acid and arsenic acid, assembling the sheets and applying heat and pressure.

4. A laminated plate comprising a pair of glass sheets cemented to the opposite sides of a sheet of cellulose plastic with a cement comprising a boron compound and one of the weak acids of the group consisting of silicic acid, stannic acid, chromic acid and arsenic acid, 5. A laminated plate comprising a pair of glass sheets cemented to the opposite sides of a sheet of cellulose plastic with a cement comprising boric acid and one of the weak acids of the group consisting of silicic acid, stannic acid, chromic acid and arsenic acid.

6. A laminated plate comprising a pair of glass sheets cemented to the opposite sides of a sheet of cellulose plastic with a cement comprising a sodium borate compound and one of the weak acids of the group consisting of silicic acid, stannic acid, chromic acid and arsenic acid.

EARL L. FIX.
BROOK J. DENNISON.